(12) United States Patent
Dangler et al.

(10) Patent No.: US 10,150,449 B2
(45) Date of Patent: Dec. 11, 2018

(54) WIPER CONTROL MECHANISM

(71) Applicant: International Business Machines Corporation, Armonk, NY (US)

(72) Inventors: John R. Dangler, Rochester, MN (US); Thomas D. Kidd, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 14/040,647

(22) Filed: Sep. 28, 2013

(65) Prior Publication Data

US 2014/0149003 A1      May 29, 2014

Related U.S. Application Data

(63) Continuation of application No. 13/688,040, filed on Nov. 28, 2012.

(51) Int. Cl.
| | |
|---|---|
| *B60H 1/00* | (2006.01) |
| *B60S 1/08* | (2006.01) |
| *H05B 3/86* | (2006.01) |
| *H05B 3/84* | (2006.01) |
| *H05B 1/02* | (2006.01) |
| *B60S 1/66* | (2006.01) |

(52) U.S. Cl.
CPC ........ *B60S 1/0822* (2013.01); *B60H 1/00735* (2013.01); *B60H 1/00785* (2013.01); *B60H 1/00821* (2013.01); *B60S 1/0866* (2013.01); *B60S 1/0896* (2013.01); *B60S 1/66* (2013.01); *H05B 1/0236* (2013.01); *H05B 3/84* (2013.01); *H05B 3/86* (2013.01)

(58) Field of Classification Search
CPC ..... B60H 1/00; F24F 7/06; F24F 7/007; F24F 13/00; B60S 1/0822
USPC .......................................................... 454/75
See application file for complete search history.

(56) References Cited

U.S. PATENT DOCUMENTS

| | | |
|---|---|---|
| 2,367,426 A | 1/1945 | Patterson |
| 2,557,004 A | 6/1951 | Lepper |

(Continued)

FOREIGN PATENT DOCUMENTS

| | | |
|---|---|---|
| CN | 201376553 | 1/2010 |
| CN | 102216129 | 10/2011 |

(Continued)

OTHER PUBLICATIONS

RD564041A research disclosure from Apr. 2011.*

(Continued)

*Primary Examiner* — Steven B McAllister
*Assistant Examiner* — Samantha Probst
(74) *Attorney, Agent, or Firm* — VanLeeuwen & VanLeeuwen; Tihon Poltavets

(57) ABSTRACT

A method to reduce refreezing of meltable snow includes configuring a wiper arm to wipe the meltable snow from an ambient-facing surface of a window positioned on a vehicle. The method also includes configuring a sensor coupled to the wiper arm to gather and transmit a parameter on the vehicle and environment. The method also includes configuring a processor to receive the parameter, determine refreezability of the meltable snow based on the parameter, and define an action to be performed by the wiper arm.

13 Claims, 4 Drawing Sheets

(56) References Cited

U.S. PATENT DOCUMENTS

| | | | |
|---|---|---|---|
| 3,046,623 A * | 7/1962 | Dietert | B22C 5/08 366/17 |
| 3,427,818 A | 2/1969 | Erickson | |
| 3,760,160 A * | 9/1973 | Gieringer | G06K 7/08 194/902 |
| 4,228,511 A * | 10/1980 | Simcoe | G05D 23/1905 165/257 |
| 5,010,289 A | 4/1991 | Takada | |
| 5,057,754 A | 10/1991 | Bell | |
| 5,249,510 A * | 10/1993 | Rozak | A47J 37/1228 99/336 |
| 5,504,965 A | 4/1996 | Guell | |
| 5,892,343 A | 4/1999 | MacK et al. | |
| 5,987,216 A | 11/1999 | Krug | |
| 6,150,639 A | 11/2000 | Ruan | |
| 6,175,205 B1 * | 1/2001 | Michenfelder | B60S 1/0818 318/444 |
| 6,281,649 B1 | 8/2001 | Ouellette et al. | |
| 6,470,731 B1 * | 10/2002 | Rieth | B60K 31/0008 73/9 |
| 6,596,978 B2 | 7/2003 | Hochstein | |
| 6,657,410 B1 * | 12/2003 | Berger | B60S 1/0818 15/250.12 |
| 6,853,897 B2 | 2/2005 | Stam | |
| 7,309,970 B2 | 12/2007 | Gao | |
| 7,345,445 B2 | 3/2008 | Huntzicker | |
| 7,423,399 B2 | 9/2008 | Pawlicki et al. | |
| 7,489,303 B1 * | 2/2009 | Pryor | B60K 35/00 345/173 |
| 7,625,274 B2 * | 12/2009 | Geiger | B60H 1/00785 454/121 |
| 7,666,150 B2 * | 2/2010 | Douglas | A61B 5/1411 600/583 |
| 8,265,824 B2 | 9/2012 | Oishi et al. | |
| 2002/0137455 A1 | 9/2002 | Ivanov | |
| 2002/0148987 A1 | 10/2002 | Hochstein | |
| 2005/0002658 A1 | 1/2005 | Kelley | |
| 2005/0159096 A1 | 7/2005 | Ouyang | |
| 2007/0047809 A1 * | 3/2007 | Sasaki | G06K 9/00791 382/170 |
| 2007/0096560 A1 * | 5/2007 | Ishikawa | B60S 1/0818 307/9.1 |
| 2007/0241612 A1 * | 10/2007 | Jacoby | B60S 1/0818 307/9.1 |
| 2007/0267993 A1 | 11/2007 | Leleve et al. | |
| 2008/0211779 A1 * | 9/2008 | Pryor | G01C 21/3664 345/173 |
| 2011/0266075 A1 | 11/2011 | Guzelimian | |
| 2012/0000024 A1 * | 1/2012 | Layton | G03B 11/00 15/97.1 |
| 2012/0234816 A1 | 9/2012 | Petrenko et al. | |

FOREIGN PATENT DOCUMENTS

| | | |
|---|---|---|
| CN | 102381284 | 3/2012 |
| EP | 0950587 | 10/1999 |
| JP | 58170615 | 10/1983 |
| JP | 63275453 | 11/1988 |

OTHER PUBLICATIONS

Derwent (DE201139).*
Office Action for U.S. Appl. No. 13/688,040 (Dangler et al., "Wiper Control Mechanism," filed Nov. 28, 2012), U.S. Patent and Trademark Office, dated Jul. 31, 2015, 14 pages.
Final Office Action for U.S. Appl. No. 13/688,040 (Dangler et al., "Wiper Control Mechanism," filed Nov. 28, 2012), U.S. Patent and Trademark Office, dated Feb. 12, 2016, 11 pages.

* cited by examiner

WIPER CONTROL MECHANISM

FIELD OF THE INVENTION

The present invention relates in general to a wiping system for a window positioned on a vehicle. More particularly, the present invention relates to a wiping system to reduce refreezing of meltable snow on a vehicle's window.

BACKGROUND

Formation of ice on windows positioned on a vehicle obscures visibility as well as decreases effectiveness of wipers installed proximate to the windows positioned on the vehicle. A heat source or a defrosting device is generally used in such situations to remove snow and ice. Devices of this type increase the temperature of the window thereby preventing formation of ice and melting any ice already formed. However, the ice may refreeze as an ambient-facing surface of the window cools, for example; after all defrosting devices and heat sources are deactivated.

In a known wiping system, a control system for operating an electrically actuated device in response to presence of moisture on a window is provided. A moisture sensor having a plurality of spaced apart, exposed conductive strips detects the presence of moisture on an ambient-facing surface of the window. The control system connected to the moisture sensor can activate the window wiper in response to detection of moisture. However, in such systems there is a delay in detection and the ice may have refrozen, result in freezing of the window wiper.

In another wiping system, two additional sensors are provided that enable melting of the ice immediately after the vehicle is shut-down. An ignition sensor detects start and shut-down of the vehicle and a window temperature sensor senses temperature of the window. A controller coupled to each of the sensors activates the window wiper assembly depending upon the signals received from the sensors. However, the wiping system cannot predict refreezability of meltable snow and enable the window wiper assembly well in advance before the meltable snow starts to melt leading to the same problem of delay in detection and causing the freezing of the window wiper.

In light of the above discussion, there is a need for a wiping system that overcomes one or more drawbacks associated with the prior art.

BRIEF SUMMARY

It is a possible benefit of the disclosure is to provide a method to reduce refreezing of meltable snow deposited on an ambient-facing surface of a window positioned on a vehicle.

Another possible benefit of the disclosure is to provide a method to prevent melting of refreezable-meltable snow deposited on an ambient-facing surface of a window positioned on a vehicle.

Yet another possible benefit of the disclosure is to provide a method to prevent deposition of refreezable-meltable snow on an ambient-facing surface of a window positioned on a vehicle.

In an embodiment of the present disclosure, a method to reduce refreezing of meltable snow includes at least one wiper arm configured to wipe the meltable snow off the ambient-facing surface of the window and at least one sensor coupled to the at least one wiper arm. The at least one sensor is configured to gather and transmit at least one parameter. The method further includes at least one processor configured to receive the at least one parameter, determine refreezability of the meltable snow based on the at least one parameter, and define an action to be performed by the at least one wiper arm.

According to another embodiment of the present disclosure, a method to prevent melting of refreezable-meltable snow is provided. The method includes at least one sensor configured to gather at least one parameter, predict the melting of the refreezable-meltable snow, and actuate a blower to sufficiently cool the window, the sufficiently cooling preventing the melting of the refreezable-meltable snow.

According to yet another embodiment of the disclosure, a method to prevent deposition of refreezable-meltable snow is provided. The method comprises at least one sensor configured to gather at least one parameter, predict the deposition of the refreezable-meltable snow, and actuate a heating element to sufficiently heat the window, the sufficiently heating preventing the deposition of the refreezable-meltable snow.

These and other exemplary embodiments, features and advantages of the present disclosure will be described or become apparent from the following detailed description of exemplary embodiments, which is to be read in connection with the accompanying drawings.

BRIEF DESCRIPTION OF THE SEVERAL VIEWS OF THE DRAWINGS

The features of the present invention, which are believed to be novel, are set forth with particularity in the appended claims. The disclosure may best be understood by reference to the following description, taken in conjunction with the accompanying drawings. These drawings and the associated description are provided to illustrate some embodiments of the disclosure, and not to limit the scope of the invention.

Figure 1:
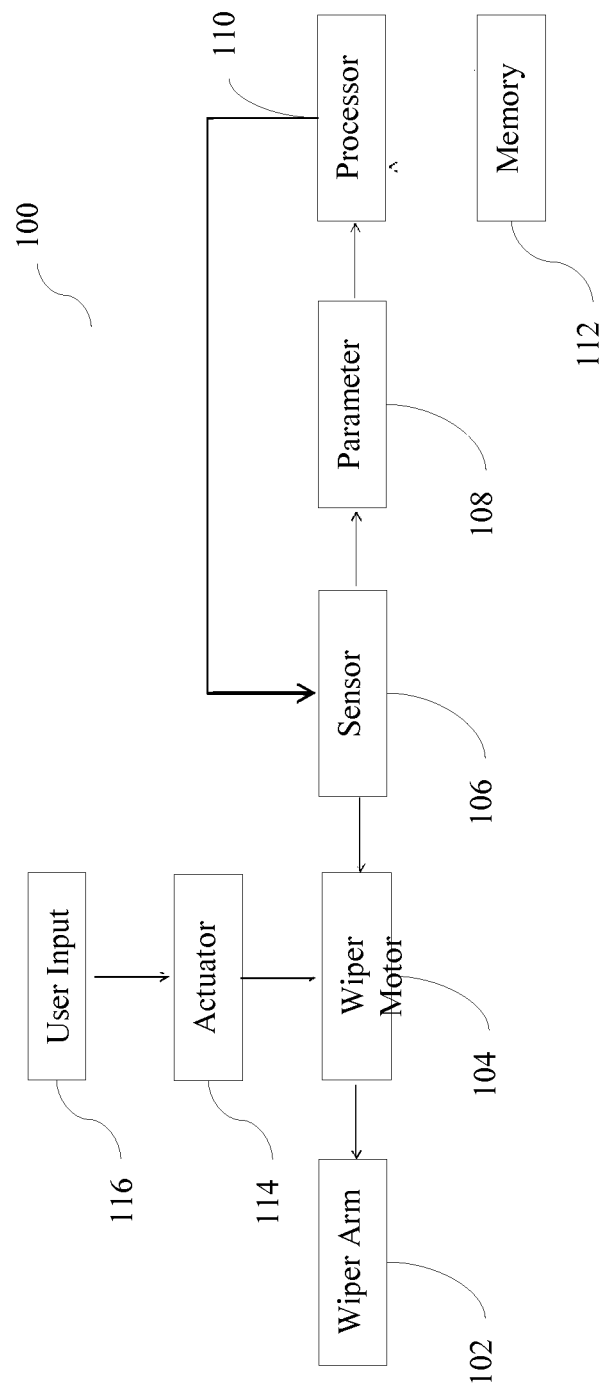
FIG. 1 is a block diagram showing an arrangement of a wiping system to reduce refreezability of meltable snow deposited on a vehicle's window, in accordance with an embodiment of the present disclosure.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION

Before describing the present disclosure in detail, it should be observed that the present disclosure utilizes a combination of arrangement and assembly components related to a wiping system for a window positioned on a vehicle. Accordingly the arrangement and the assembly components have been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1 is a block diagram of a wiping system 100 having an arrangement to reduce refreezing of meltable snow deposited on an ambient-facing surface of a window positioned on a vehicle. The wiping system 100 includes at least one wiper arm 102, a wiper motor 104, at least one sensor 106 and at least one processor 110. Examples of the window may include, but are not limited to, a windshield, a side window, a sun roof or a convertible top of a motor vehicle.

The at least one wiper arm 102 is operatively coupled to the wiper motor 104 which in turn is coupled to the at least one sensor 106. Examples and further details of the at least one sensor 106 may be found in conjunction with FIG. 3.

The at least one sensor 106 is configured to gather and transmit at least one parameter 108. Examples and further details of the at least one parameter 108 may be found in conjunction with FIG. 2.

The at least one processor 110 is configured to receiving the at least one parameter 108 to determine refreezability of the meltable snow based on the at least one parameter 108. Based on this determination, the at least one processor 110 can determine an action to be taken by the at least one wiper arm 102.

Moving on the at least one parameter 108 sensed and transmitted by the at least one sensor 106 are used by the at least one processor 110 to determine the action as mentioned above. This is enabled using a memory 112 to which the processor 110 is operatively coupled to. The memory 112 may store a set of predetermined rules based upon each of the at least one parameter 108 and their combinations thereof. These predetermined rules help the processor 110 determine whether or not to deliver a wiper actuation command to the wiper motor. Examples of the memory 112 include, but are not limited to, magnetic or optical memory, flash memory, random access memory (RAM), read-only memory (ROM), or any other storage medium that supports storage of data for an arbitrary period of time.

In an example, when the at least one sensor 106 is an ambient temperature sensor, the processor 110 may use a rule in which an ambient temperature is compared to a predetermined temperature value stored in the memory 112. Accordingly, if the ambient temperature is found to be more than the predetermined temperature value, the wiper motor 104 will be enabled. In an embodiment, the ambient temperature threshold may also be defined and inputted by a user of the vehicle.

For example, in an embodiment, the memory 112 may also store a wiping frequency in which the at least one wiper arm 102 may be actuated. A timer may be provided as a part of the wiping system 100 for this purpose.

In another embodiment, the user can input also various data overriding the parameters being gathered by the at least one sensor 106. The input may comprise an input for activating or deactivating the wiping system 100, selecting preferred time and/or temperature thresholds and an input for manual selection of wiper speed. The memory 112 simultaneously stores changes made by the user. For the purpose of activating or deactivating the wiping system 100, an actuator 114 actuable by the user is provided. Additionally, the user may request termination of any one of two successive actuations.

Figure 2:
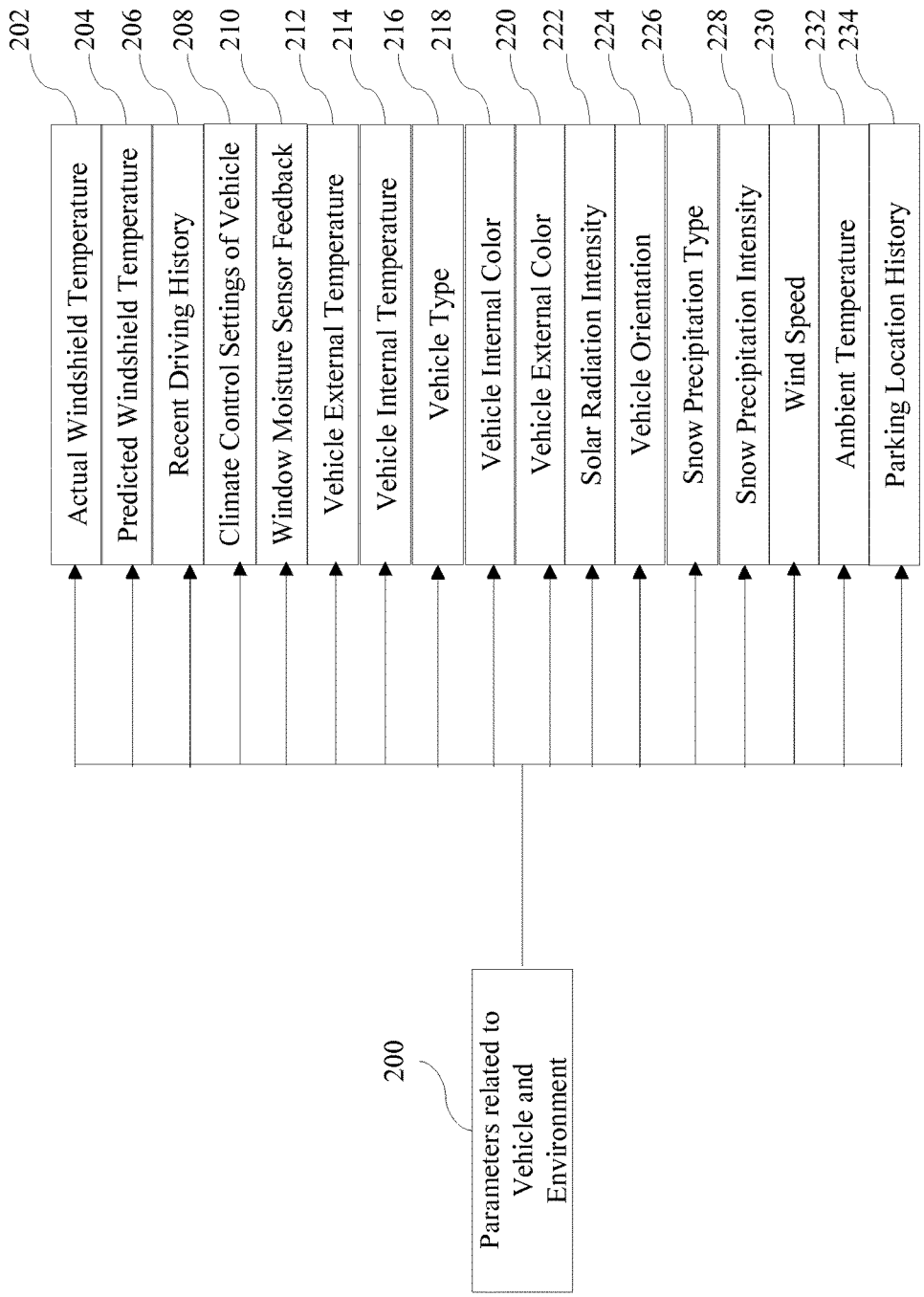
FIG. 2 represents various parameters related to a vehicle and environment that are used to determine the refreezability of the meltable snow deposited on the vehicle's window, in accordance with an embodiment of the present disclosure.

Moving on, FIG. 2 represents various parameters 200 related to a vehicle and environment that may be gathered and transmitted by the at least one sensor 106 to the at least one processor 110, in accordance with an embodiment of the present disclosure. The parameters 200 can include, but are not limited to, actual window temperature 202, predicted window temperature 204, recent driving history 206, climate control settings of the vehicle 208, window moisture sensor feedback 210, vehicle external temperature 212, vehicle internal temperature 214, vehicle type 216, vehicle internal color 218, vehicle external color 220, solar radiation intensity at the vehicle 222, vehicle orientation 224, snow precipitation type 226, snow precipitation intensity 228, wind speed 230, ambient temperature 232 and parking location history 234. The at least one parameter 108 can be selected from any of the parameters 200 and may be gathered using corresponding different sensors.

Figure 3:
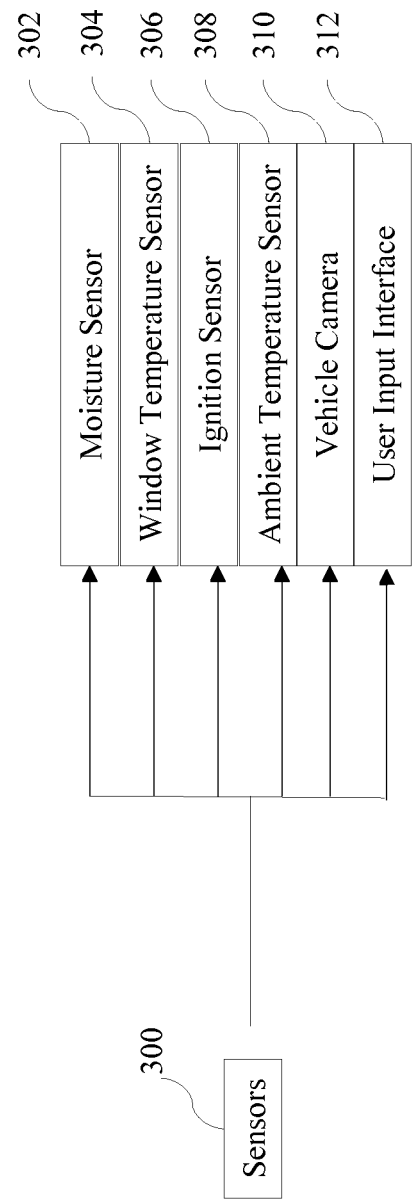
FIG. 3 represents various sensors for obtaining various parameters related a vehicle and environment, in accordance with an embodiment of the present disclosure.

FIG. 3 represents different sensors 300 that may be used for obtaining the at least one parameter 108. The different sensors 300 may include, but are not limited to, a moisture sensor 302, a window temperature sensor 304, an ignition sensor 306, an ambient temperature sensor 308, a vehicle camera 310 and a user input interface 312. In an embodiment, the at least one sensor 106 may be selected from the different sensors 300.

In an embodiment, when for example, the moisture sensor 302, the window temperature sensor 304, the ignition sensor 306, ambient temperature sensor 308 are selected as the at least one sensor 106. The moisture sensor 302 will detect presence of moisture on the ambient-facing surface of a window, and the window temperature sensor 304 will monitor the temperature of the window. Ignition sensor 306 will detect the starting and stopping of a vehicle's engine. The ambient temperature sensor 308 will monitor air temperature external to the vehicle. The at least one processor 110 utilizes data provided by the sensors 302, 304, 306 and 308 to determine whether or not a wipe command should be transmitted to the wiper motor 104 to enable the at least one wiper arm 102 wipe the meltable snow off the window. In an embodiment, data obtained from the user input may also be used.

In another embodiment, when the at least one sensor 106 is the vehicle camera 310, the determination by the at least one processor 108 may also be based on input from the vehicle camera 310, the inputs can include, but are not limited to, photographs of the ambient and photographs of the window etc.

Figure 4:
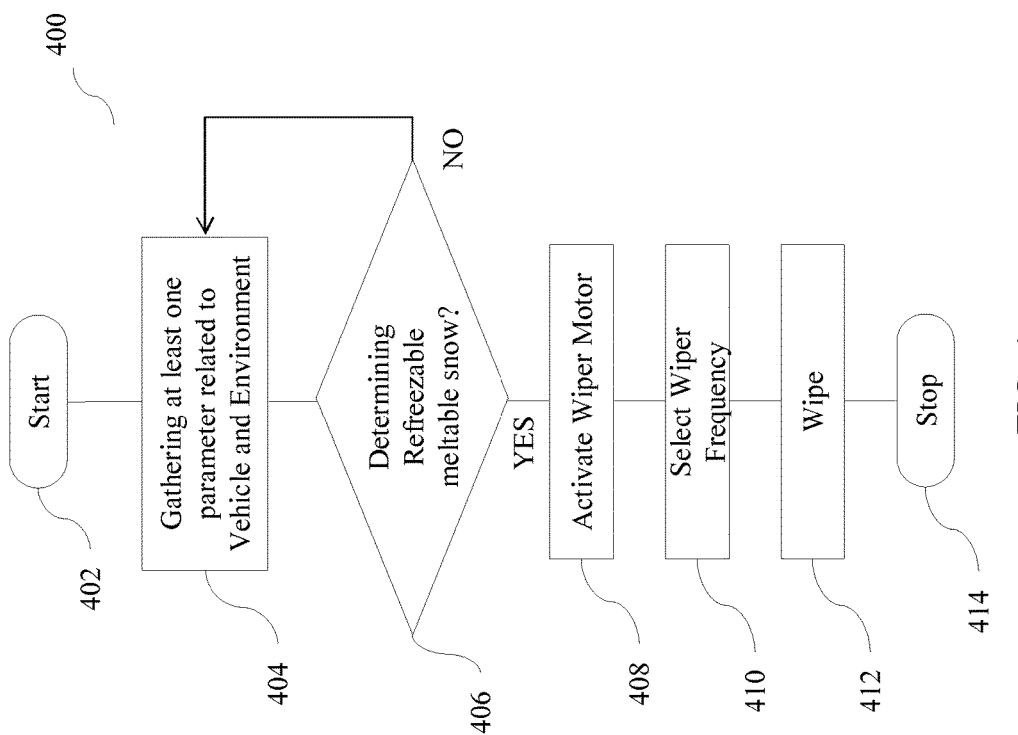
FIG. 4 is a flow chart illustrating a method of actuation of a wiping mechanism, in accordance with an embodiment of the present disclosure.

Moving on, FIG. 4 represents a flow chart illustrating a method 400 of a wiping mechanism that reduces refreezability of meltable snow, in accordance with an embodiment of the present disclosure. For the purpose of this description, the method 400 is explained in conjunction with the wiping system 100 and its various components. However, it will be readily apparent to those ordinarily skilled in the art that the method 400 can also be applied, without deviating from the scope of the disclosure, for any other wiping system. Moreover, the disclosure is not limited to the order in which the steps are listed in the method 400. In addition, the method 400 can contain a greater or fewer numbers of steps than those shown in FIG. 4.

The method 400 is initiated at step 402. Thereafter at step 404, a sensor, for example, the at least one sensor 106 gathers at least one parameter, for example the at least one parameter 108, related to vehicle and environment.

Moving on, step 406 involves a determination of whether the meltable snow is refreezable or not takes place based on the at least one parameter 108. This determination is carried out by a processor, for example the processor 110. If it is determined that the meltable snow will not refreeze, the method 400 returns to the step 404, else if it is determined that the meltable snow can refreeze the method 400 moves on to step 408. At the step 408, a wiper motor is activated for actuating wiper arms, for example the at least one wiper arm 102. Thereafter at step 410, a wiping frequency is selected based on the at least one parameter 108.

Thereafter, at step 412, the at least one wiper arm 102 wipes the meltable snow off the window and the method 400 is terminated at step 414.

Moving on, according to an embodiment of the disclosure, the at least one wiper arm 102 is actuated at a predetermined wiping frequency. The at least one processor 110 determines the predetermined wiping frequency based on the at least one parameter 108. The wiping frequency may range from one wiper cycle per minute for thirty minutes to three wiper cycles per minute for thirty minutes. As an example, the wiping frequency could be one wiper cycle per five minutes for one hour to three wiper cycle per five minutes for one hour. The arrangement further includes a timer configured to determine a time period between two successive actuations of the at least one wiper arm 102. The timer determines the time period between the two successive actuations of the at least one wiper arm 102 preferably within a selected time-out period of the timer.

According to another embodiment of the present disclosure, an arrangement to prevent melting of refreezable-meltable snow deposited on the ambient-facing surface of the window is provided. The arrangement includes the at least one sensor 106 and a blower. The at least one sensor is configured to gathering the at least one parameter 108 and predicting the melting of the refreezable-meltable snow. Based on the prediction by the at least one sensor 106, the blower is actuated to sufficiently cool the window, so as to prevent the melting of the refreezable-meltable snow.

Additionally, the arrangement may also include the actuator 114 actuable by the user to request termination of the blower. A timer may be coupled to the actuator to enable the user to configure the timer for termination of the blower.

According to yet another embodiment of the disclosure, an arrangement to prevent deposition of refreezable-meltable snow on the ambient-facing surface of the window is provided. The arrangement includes the at least one sensor 106 and a heating element. The at least one sensor 106 is configured to gathering the at least one parameter 108 and predicting the deposition of the refreezable-meltable snow. Based on the prediction by the at least one sensor 106, the heating element is actuated to sufficiently heat the window, so as to prevent the deposition of the refreezable-meltable snow. The predicting by the at least one sensor 106 can be based on an input from the vehicle camera 310. Additionally, the arrangement may comprise the actuator 114 actuable by the user to request termination of the heating element. A timer may be coupled to the actuator 114 to enable the user to configure the timer for termination of the heating element.

Also, it should be appreciated that the disclosure utilizes a combination of method steps and system components related to computer-implemented method for controlling and reducing refreezability of meltable snow. Accordingly, it will be appreciated that embodiments of the disclosure described herein includes one or more conventional processors and unique stored instructions that control the one or more processors to implement, in conjunction with certain non-processor circuits, some, most, or all of the functions of the method of controlling and reducing refreezability of meltable snow. The non-processor circuits may include, but are not limited to, a radio receiver, a radio transmitter, signal drivers, clock circuits, power source circuits, and user input devices. As such, these functions may be interpreted as steps of the method. Methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All documents referenced herein are hereby incorporated by reference.

What is claimed is:

1. A method to reduce refreezing of meltable snow deposited on an ambient-facing surface of a window positioned on a vehicle, wherein at least one wiper arm is configured to wipe the meltable snow off the ambient-facing surface of the window, and wherein at least one sensor is coupled to the at least one wiper arm, the at least one sensor configured to gather and transmit at least one parameter, the method comprising:
   receiving the at least one parameter;
   predicting a melting of the meltable snow and refreezability of the meltable snow based on the at least one parameter and a user-defined temperature threshold; and
   performing an action to be performed by the at least one wiper arm based upon the predicting.

2. The method according to claim 1, wherein the defined action comprises engaging the at least one wiper arm to wipe the meltable snow off the window.

3. The method according to claim 1, wherein the at least one parameter is selected from the group comprising actual window temperature, predicted window temperature, recent driving history, window moisture sensor feedback, vehicle external temperature, vehicle internal temperature, vehicle type, vehicle internal color, vehicle external color, solar radiation intensity at the vehicle, vehicle orientation, snow precipitation type, snow precipitation intensity, wind speed, ambient temperature and parking location history.

4. The method according to claim 1, wherein the at least one parameter is gathered based on an input from a camera installed on the vehicle.

5. A method to reduce refreezing of meltable snow deposited on an ambient-facing surface of a window positioned on a vehicle, wherein at least one wiper arm is configured to wipe the meltable snow off the ambient-facing surface of the window, and wherein at least one sensor is coupled to the at least one wiper arm, the at least one sensor configured to gather and transmit at least one parameter, the method comprising:
   receiving the at least one parameter;
   predicting a melting of the meltable snow and refreezability of the meltable snow, and a wiping frequency of the at least one wiper arm based on the at least one parameter and a user-defined temperature threshold; and
   enabling actuation of the at least one wiper arm to wipe the meltable snow off the windshield at the wiping frequency based upon the predicting.

6. The method according to claim 5, wherein the wiping frequency may range from one wiper cycle per minute for thirty minutes to three wiper cycles per minute for thirty minutes.

7. The method according to claim 5, wherein the wiping frequency is one wiper cycle per five minutes for one hour to three wiper cycles per five minutes for one hour.

8. The method according to claim 5, wherein the at least one parameter is selected from the group comprising actual window temperature, predicted window temperature, recent driving history, window moisture sensor feedback, vehicle external temperature, vehicle internal temperature, vehicle type, vehicle internal color, vehicle external color, solar radiation intensity at the vehicle, vehicle orientation, snow precipitation type, snow precipitation intensity, wind speed, ambient temperature and parking area history.

9. The method according to claim 5, wherein the at least one parameter is gathered based on an input from a camera installed on the vehicle.

10. The method according to claim 5 further comprising configuring a timer to determine a time period between two successive actuations of the at least one wiper arm.

11. The method according to claim 10, wherein the timer determines the time period between the two successive actuations of the at least one wiper arm within a selected time-out period of the timer.

12. The method according to claim 10, wherein the time period determined by the timer is based on the at least one parameter.

13. The method according to claim 10 further comprising an actuator actuable by a user of the vehicle to request termination of any one of the two successive actuations.

* * * * *